Fig.1.

WALTER·T·HASWELL.
&
CLIFFORD·H·PARMELEE.
INVENTORS.

WALTER·T·HASWELL
&
CLIFFORD·H·PARMELEE
*INVENTORS*

BY *Bodell + Thompson*
*Attorneys*

May 25, 1954  W. T. HASWELL ET AL  2,679,386
APPARATUS FOR COMPACTING BUNGS OF CERAMIC WARE
Filed Dec. 28, 1951  6 Sheets-Sheet 4

WALTER·T·HASWELL.
&
CLIFFORD·H·PARMELEE.
INVENTORS.

BY Bodell + Thompson
Attorneys

WALTER·T·HASWELL
&
CLIFFORD·H·PARMELEE
INVENTORS.

May 25, 1954 W. T. HASWELL ET AL 2,679,386
APPARATUS FOR COMPACTING BUNGS OF CERAMIC WARE
Filed Dec. 28, 1951 6 Sheets-Sheet 6

WALTER·T·HASWELL
&
CLIFFORD·H·PARMELEE
INVENTORS.

BY Bodell + Thompson
Attorneys

Patented May 25, 1954

2,679,386

UNITED STATES PATENT OFFICE 2,679,386

APPARATUS FOR COMPACTING BUNGS OF CERAMIC WARE

Walter T. Haswell and Clifford H. Parmelee, Syracuse, N. Y., assignors to Onondaga Pottery Company, Syracuse, N. Y., a corporation of New York Application December 28, 1951, Serial No. 263,946

13 Claims. (Cl. 259—72)

1

This invention relates to apparatus for compacting loose granular refractory material between pieces of chinaware arranged in a bung. Apparatus of this type is disclosed in the copending application of R. H. Pass, Sr. No. 201,407, filed December 18, 1950, now Patent No. 2,595,880, granted May 6, 1952.

The invention has as an object an apparatus of the type referred to embodying conveyor means for advancing bungs of ware to a compacting station and compacting mechanism arranged at the station for automatically compacting the loose material between the pieces of ware in the bung.

The invention has as a further object compacting apparatus embodying power actuated means for progressively contacting diametrically opposite side portions of the compacting casing.

The invention consists in the novel features and in the combinations and constructions hereinafter set forth and claimed.

In describing this invention, reference is had to the accompanying drawings in which like characters designate corresponding parts in all the views.

The apparatus consists of a framework in which there is mounted for horizontal movement a conveyor operable to advance bungs of ware successively to and past a compacting station. The framework extends vertically upwardly from the conveyor and has mounted on it for vertical movement a carriage. The compacting casing is mounted upon the carriage and also the power operated mechanism for actuating the casing. When the conveyor advances a bung of ware in registration with the casing, the carriage is lowered to position the casing about the bung of ware, and a supply of refractory material is deposited in the space between the periphery of the bung of ware and the casing, and the casing is thereupon contracted at diametrically

2 opposite points progressively about the circumference of the casing. When the bung of ware has thus been compacted, the carriage and the casing are moved upwardly and the bung of ware advanced to an unloading station. That portion of the framework in which the bung conveyor is mounted consists of a plurality of pairs of upright members 20, 21, 22, 23, connected at their upper ends to side rails 24, 25, and transversely extending end members 26, 27.

Figure 1:
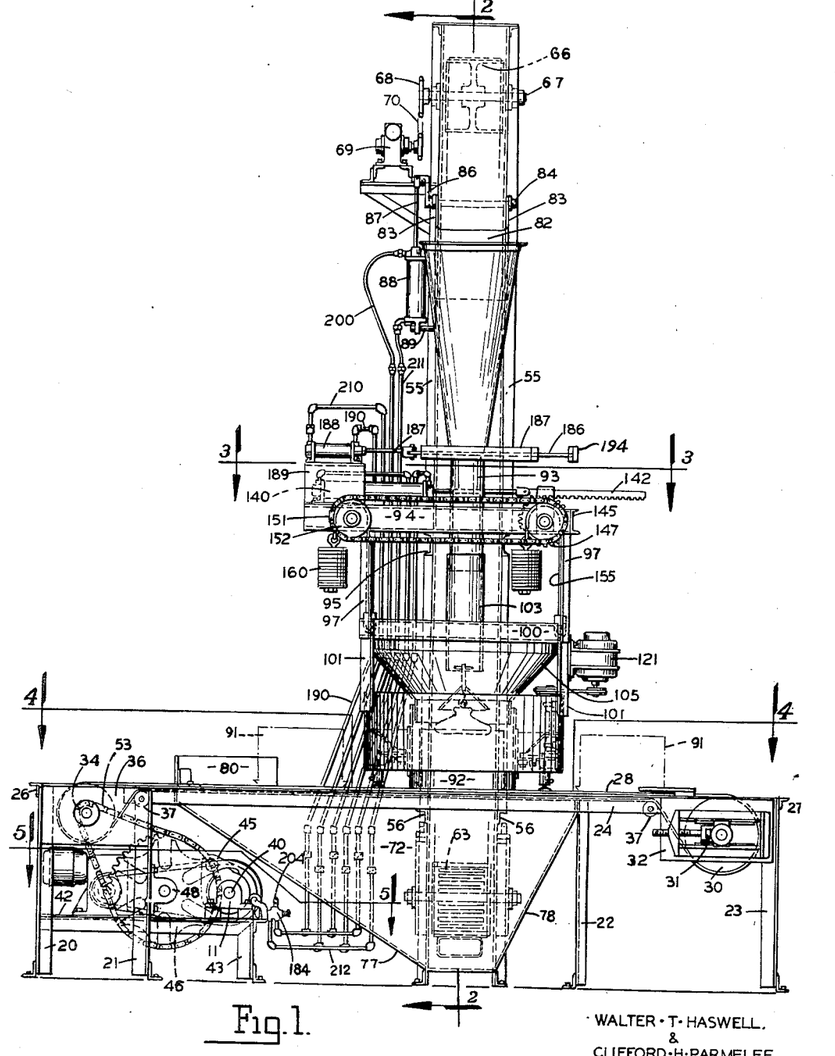
Figure 1 is a front elevational view of an apparatus embodying our invention.
Figure 4:
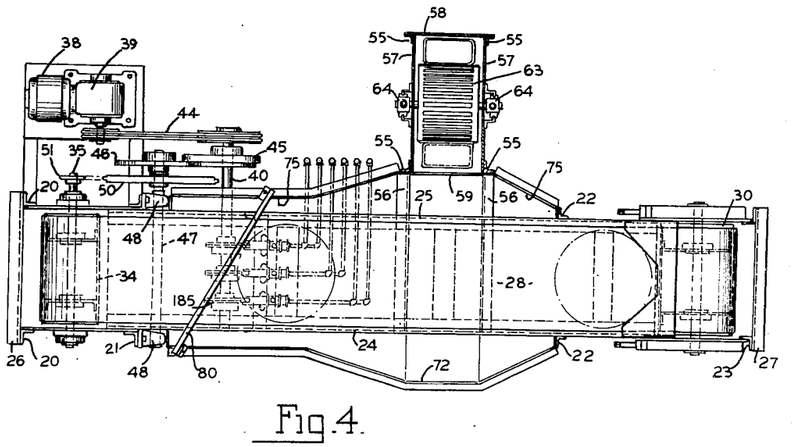
Figure 4 is a view taken on line 4—4, Figure 1.

The conveyor consists of a flat endless belt 28 with the upper run of the belt positioned above the side rails 24, 25, and moving to the left, Figures 1 and 4. One end of the belt is trained over an idler roll 30 mounted on a shaft journalled in adjustable bearings 31 carried by plates 32 attached to the uprights 23 and the adjacent end portions of the side rails 24, 25. At the opposite end of the framework, the belt is trained over a driving pulley 34 mounted on a shaft 35 journalled in bearings carried by plates 36. The lower run of the belt is trained over small idler rolls 37 journalled between the side rails 24, 25, in adjacency to the rolls 30, 34, see Figure 1.

The conveyor belt 28 is intermittently operated by a motor 38 equipped with a gear reduction 39, the output shaft of which is operatively connected to a shaft 40 journalled in bearings 41 mounted on rails 42 secured to the uprights 20, 21, and a pair of short uprights 43. The connection between the driving motor and the shaft 40 is by means of the belts 44. The shaft 40 has affixed to it a Geneva crank 45 cooperable with a six station Geneva disc 46 mounted on a shaft 47 journalled in bearings 48 secured to the uprights 21. The shaft 47 carries a sprocket 50 operatively connected to a sprocket 51 on the shaft 35 by a chain 53.

The frame further includes four vertical uprights 55, the front pair of these uprights being connected to the side rails 24, 25, by horizontally arranged members 56. The uprights 55 form the corner supports of a vertically extending housing rectangular in cross section and being formed with side walls 57, a rear wall 58 and a front wall 59. A refractory material conveyor is mounted in the vertical housing and functions to convey the material to the top of the housing and deposit the same in the upper portion 60 of a hopper. This conveyor consists of an endless belt 61 provided with a multiplicity of buckets 62, the belt being trained about a lower pulley 63 mounted on a shaft journalled in bearings 64 secured to the side walls 57 of the housing. The belt is also trained over a pulley 66 mounted on a shaft 67 journalled in the upper end of the housing and being provided with a sprocket 68 operatively connected to a driving motor 69 by a chain 70.

A bin is arranged below the bung conveyor belt 28 and is formed with a front wall 72 which inclines upwardly and outwardly from the bottom wall 73 of the vertical housing. The upper forward edge of the wall 72 extends forwardly of the bung conveyor an appreciable distance, see Figures 2 and 4, and in like manner, the rear wall 75 of the bin extends rearwardly from the rear side rail 25. The bin is also formed with inclined bottom walls 77, 78, which, in conjunction with the front wall 72, serve to direct the loose refractory material, falling off from the conveyor belt 28, to the lower end of the vertical housing. There is provided a bar 80 extending transversely of the conveyor belt 28 and secured at its ends to the front wall 72 and the rear wall 75 of the bin, see Figures 1 and 4. This bar serves to sweep the loose refractory material off from the belt during its advancement and effect deposit of the material into the bin, the inclined walls of the bin directing the material to the bottom portion of the vertical housing where it is picked up by the buckets 62 and elevated to the top of the housing and deposited into the upper hopper portion 60, the lower end of which is normally closed by an arcuate gate member 82 mounted on quadrant plates 83 which, in turn, are fixed to a shaft 84 journalled in the side walls of the hopper and which is provided at one end with a crank member 86. The piston rod 87 of cylinder 88 is operatively connected to the crank 86, the lower end of the cylinder being pivotally mounted on a bracket 89 secured to the vertical conveyor casing.

When a bung of ware, indicated at 91, has been advanced to the compacting station located in front of the vertical housing, a compacting casing 92 is lowered to the conveyor belt 28 so that the casing surrounds the bung of ware. This casing is arranged in coaxial relationship with a chute 93 depending from the lower end of the lower hopper portion 90. The chute 93 is fixedly secured to a pair of channel members 94 which, in turn, are supported by a pair of channel members 95 mounted on the side walls 57 of the vertical housing and extending forwardly therefrom. Four guide members 97 are fixedly secured to the channel members 94 and depend therefrom. A carriage is slidably mounted for vertical movement on the guide members 97. This carriage consists of a pair of horizontally arranged channel bars 100 having angle pieces 101 fixed thereto and arranged in sliding engagement with the angle pieces 97. A tubular member 103 is fixedly attached between the members 100, see Figure 6, with the upper end of the member 103 telescoping over the lower end of the chute 93 and forming a continuation thereof. A conical hopper 105 is fixed to the channel members 100, depending therefrom, and arranged concentrically of the lower chute portion 103 and terminating in a cylindrical portion 106 positioned within the upper end of the casing or coddle 92, see Figure 7.

Figure 12:
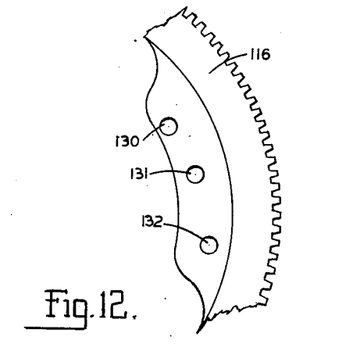
Figure 12 is a fragmentary plan view of the ring gear for actuating the compacting casing.

The carriage further includes a cylindrical member 108 welded or otherwise fixedly secured to the lower ends of the angle pieces 101. A plurality of brackets 109 extend inwardly from the member 108 and are apertured to receive pins 110, the outer ends of which extend through the side wall of the cylindrical member 108 and are held against axial movement by adjusting nuts 111, see Figure 6. The upper portion of the casing 92 is formed with vertically arranged rows of apertures 113 for the reception of the inner ends of the pins 110. In this manner, the casing 92 is suspended concentrically within the cylindrical member 108. An annular support member 114 is fixed in the lower end of the member 108 and is formed with an annular groove to receive the annular flange 115 formed on a ring gear 116, the gear being supported on a series of balls 117 positioned in the groove. The gear 116 is arranged in mesh with a pinion gear 118 mounted on the lower end of a shaft 119 journalled in bearings 120 fixed to the inner surface of the member 108, see Figure 7. The shaft 119 is rotated by a motor 121 mounted on a plate 122 fixed to the ends of the channel members 100, the motor being operatively connected to the shaft 119 by a belt 125 trained over pulleys 126, 127, see Figure 7. The ring gear 116 is formed at diametrically opposite portions of its bore with a series of apertures 130, 131, 132, to receive studs 133 carrying rollers 134, see Figure 12.

Figure 6:
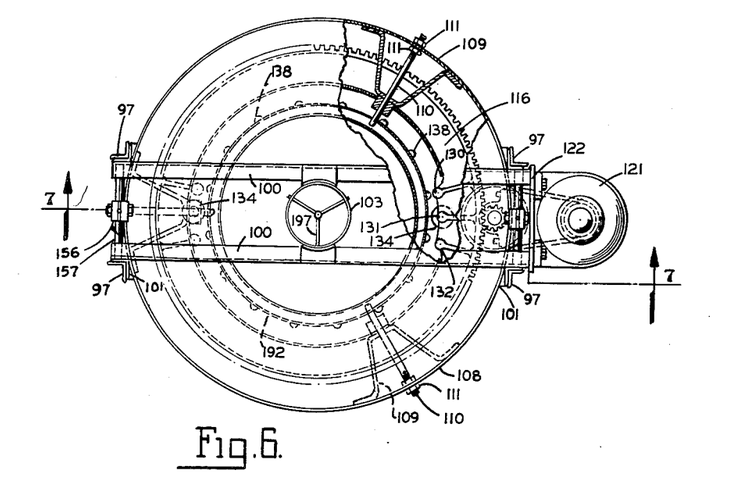
Figure 6 is a view taken on line 6—6, Figure 2.
Figure 7:
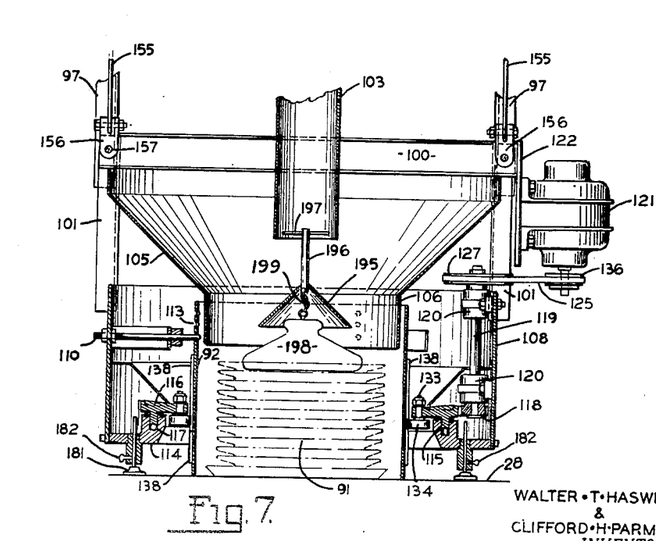
Figure 7 is a view taken on line 7—7, Figure 6.

In Figures 6 and 7, the studs 133 are positioned in the apertures 131. The apertures 130, 131, 132, of each group are located a different distance from the axis of the ring gear 116, the apertures 130 being nearest to the axis of the gear while the apertures 132 are farthest from the axis of the gear, and the apertures 131 are located at an intermediate distance.

The casing 92 is formed on its periphery with a plurality of vertically extending ribs 138 spaced apart circumferentially, see Figure 6. The arrangement is such that upon rotation of the ring gear 116 by the motor 121, the rollers 134 engage the ribs 138, causing diametrically opposite side portions of the casing to be compressed inwardly. The casing is formed of resilient material and as the rollers 134 move out of engagement with the ribs 138, the casing springs outwardly into normal circular shape. In this manner, diametrically opposite side portions of the casing are moved radially inwardly and outwardly progressively about the circumference of the casing. If the roller studs 133 are positioned in the apertures 130, maximum movement of the casing wall is effected. On the other hand, if these studs are located in the apertures 132, less motion is transmitted to the side wall of the casing. With this arrangement, the amplitude of the radial movement imparted to the side wall of the casing may be varied.

Figure 2:
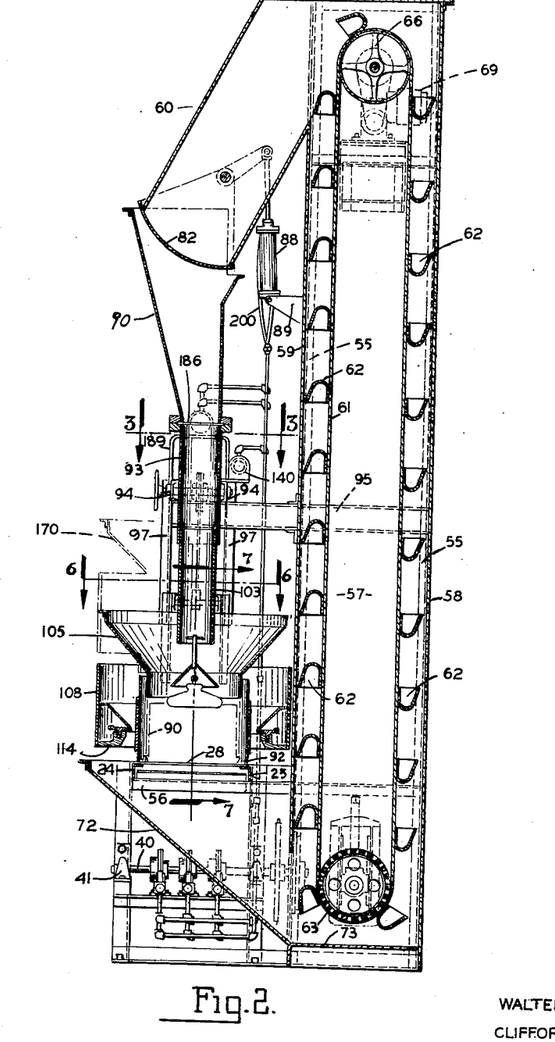
Figure 2 is a view taken on line 2—2, Figure 1.
Figure 3:
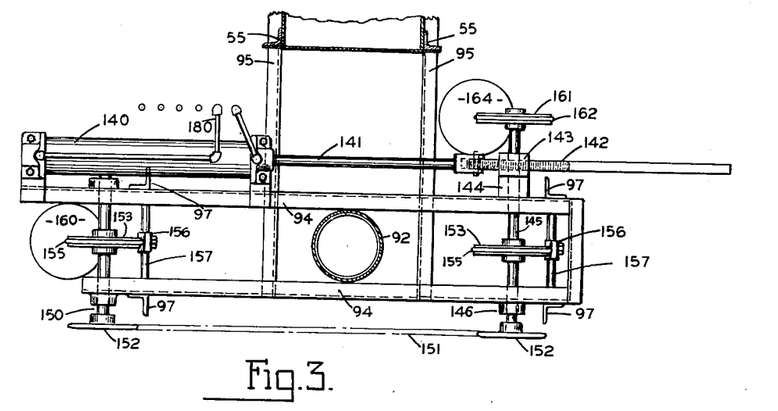
Figure 3 is a view taken on line 3—3, Figures 1 and 2.

The carriage, on which the casing 92 and the actuating mechanism described is mounted, is moved vertically by a cylinder structure 140 mounted on one of the channel members 94, see Figures 1 and 3. The piston rod 141 is connected at its outer end to a gear rack 142 slidably mounted in a housing 143 carried by a bearing 144 affixed to the channel member 94 and in which there is journalled a shaft 145, the opposite end being journalled in a bearing 146 carried by the other channel member 94. The shaft 145 has affixed to it a gear 147 positioned in the housing 143 and arranged in mesh with the gear rack 142. The shaft 145 is connected to a shaft 150, also journalled transversely in the members 94, by a chain 151 trained over a pair of sprockets 152 mounted on the forward ends of the shafts 145, 150, whereby the shafts are rotated in unison. A pulley 153 is fixedly mounted on each of the shafts 145, 150, intermediate the channel members 94. A flexible strand 155 is trained over each of the pulleys 153, the lower ends of the strand 155 being attached to a clevis 156 secured to the channel members 100 by transversely extending pins 157. One of the strands 155 has attached to its opposite end a weight 160, and there is mounted upon the rear end of the shaft 145 a pulley 161 over which there is trained a flexible strand 162 attached to a weight 164, the weights 160, 164, serving to counterbalance the carriage, as will be apparent. Upon reciprocation of the piston rod 141, the shaft 145 is rotated in a clockwise direction, Figure 1, to lower the carriage to position the casing 92 about the bung 91 positioned on the conveyor belt 28. The admission of fluid to the right end of the cylinder 140, Figure 3, effects rotation of the shafts 145, 150, Figure 1, in a counter-clockwise direction, raising the carriage to the dotted outline position 170, Figure 2.

When the conveyor belt 28 is advanced by the Geneva drive, a bung of ware 91 is positioned coaxially with the member 108 and the casing 92. Thereupon, fluid is admitted to the cylinder 140 through conduit 180, causing the piston rod 141 and the rack 142 to move to the right, Figures 1 and 3, effecting rotation of the shafts 145, 150, in a clockwise direction, and effecting downward movement of the carriage including the cylindrical member 108 and the casing 92. The extent of this downward movement of the carriage is determined by stop members 181 engaging the conveyor belt 28, see Figure 7. These members are adjustably mounted in the annular member 114 by screws 182. With the carriage in this position, the lower edge of the casing 92 engages the belt 28, or is spaced upwardly therefrom a minute distance. Fluid is supplied through the conduit 180 through a valve 184 actuated by a cam 185 mounted on the shaft 40.

Figure 5:
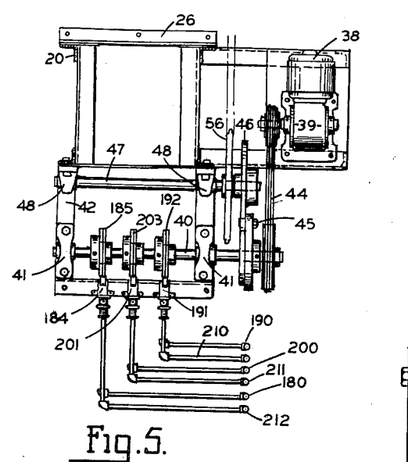
Figure 5 is a view taken on line 5—5, Figure 1.

When the carriage is lowered to compacting position, as shown in Figure 7, a gate in the form of a flat plate 186, slidably mounted in a housing 187, is actuated to permit the passage of the compacting medium from the lower hopper portion 90 into the upper chute portion 93. The gate 186 is connected to a piston rod 187 slidably mounted in a cylinder 188 mounted on a bracket 189 supported by the channel members 94. Fluid is admitted to the cylinder 188 through a conduit 190 through a valve 191 actuated by cam 192 also mounted on the shaft 40, see Figure 5. This effects movement of the gate 186 to the left, Figure 1, causing the aperture in the gate to move in registration with the chute 92 whereupon the compacting medium is discharged downwardly through the chute and is dispensed by the lower chute portion 103 where it is directed between the bung of ware and the interior of the cylindrical casing 91. The gate 186 is provided with an enlargement 194 which strikes against the housing 187 when the gate is opened. This blow of the hammer portion 194 will jar loose any material that may be stuck in the chute. The flow of the compacting material is directed by the conical member 105, and a conical deflecting member 195 carried by a rod 196 secured to the lower end of the chute portion 103, as by braces 197, see Figure 7.

It will be recalled that the lower chute portion 103 is fixedly secured to the channel members 100 of the carriage and accordingly moves up and down with the carriage. A weight 198 is suspended from the lower end of the rod 196, as by a chain 199. The arrangement is such that the weight 198 is lowered and rests upon the top plate in the bung of ware and serves to keep the bung in place on the conveyor belt 28 during the compacting operation, this arrangement being illustrated particularly in Figure 7.

The hopper gate 82 is also operated in timed relation with the lowering of the carriage and the movement of the gate 186. The gate 82 is moved to open position by the admission of fluid through the conduit 200 through the valve 201 actuated by cam 203 mounted on the shaft 40. Fluid is supplied to the valves 184, 191 and 201 through conduits 204, and the cams 185, 203 and 192 are so fixedly mounted on the shaft 40 relative to each other and to the Geneva drive for the conveyor belt so that the carriage is lowered and the gates 82, 186, operated in proper timed sequence. The gates are opened for only a very short interval and then moved to closed position. The gate 186 is moved to closed position, as shown in Figure 1, by the admission of fluid in the opposite end of the cylinder 188 through the conduit 210 also connected to the valve 191. The hopper gate 82 is moved to closed position, as shown in Figure 2, by the admission of fluid to the lower end of the cylinder 88 through the conduit 211 connected to the valve 201. The function of the gate 186 is to discharge an amount of the compacting medium in excess of the space between the bung of ware 91 and the interior of the casing 92 so that there will be ample material available in the casing for the compacting operation. The function of the gate 82 is to discharge an equal amount of compacting material in the lower hopper portion 89 so that it will be available for delivery when the gate 186 is opened. The upper hopper portion 60 is proportioned to receive an accumulation of the compacting material from the conveyor which, in normal operation, runs continuously.

The carriage remains in down position until the compacting operation has been completed. Upon downward movement of the carriage, the motor 121 is energized to effect rotation of the ring gear 116, causing the rollers 134 carried thereby to engage the ribs 138 on the exterior of the casing 92 and thereby effect radial inward movement of diametrically opposite portions of the casing progressively about the circumference thereof to effect compacting of the granular material between the rims of the pieces of ware in the bung.

At the conclusion of the compacting operation, fluid is admitted to the right hand end of the cylinder 140 through the conduit 212, causing the rack 142 to move to the left, Figure 1, and effect upward movement of the carriage to the dotted line position 170, Figure 2. Thereupon, the Geneva drive moves the conveyor belt 28 one step to the left, Figure 1, advancing the compacted bung of ware and moving an uncompacted bung in registration with the casing 92.

Figure 8:
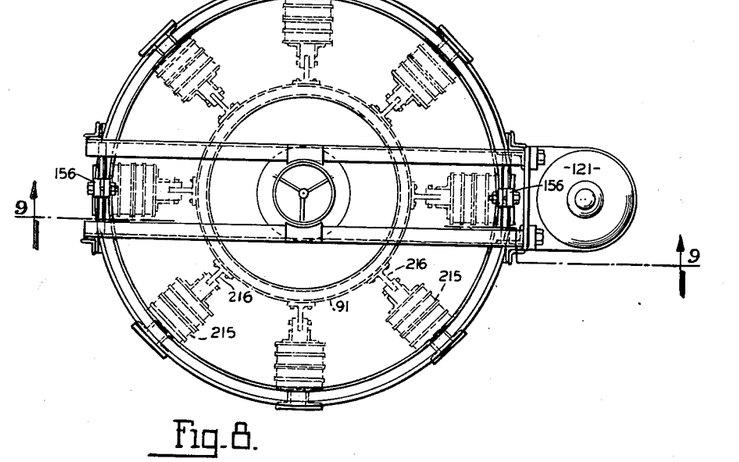
Figure 8 is a view, corresponding to Figure 6, showing a modified form of actuating mechanism for the casing.
Figure 9:
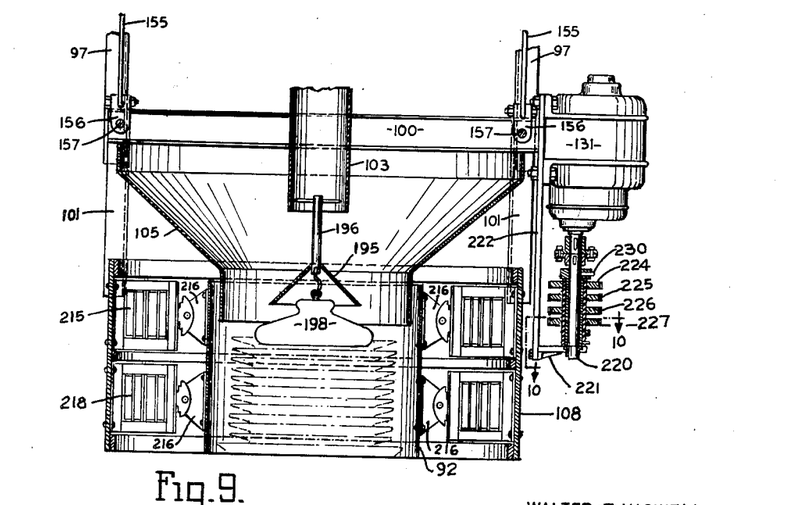
Figure 9 is a view taken on line 9—9, Figure 8.

A modified form of actuating mechanism for the casing 92 is illustrated in Figures 8 and 9 of the drawings. In this structural arrangement, an annular series of solenoids 215 are mounted within the cylindrical member 108 and are operatively connected to the casing 92 through plates 216 fixedly mounted to the casing adjacent the upper portion thereof. A second series of solenoids 218 are mounted in the lower portion of the member 108 and are connected to the lower portion of the casing. A shaft 220 is connected to the motor 121, the lower end of the shaft being journalled in a bracket 221 carried by a plate 222 fixed to the carriage. As illustrated, there are eight of the solenoids 215 in the upper series and a like number 218 in the lower series, those in the lower series being mounted directly below the solenoids in the upper series.

Figure 10:
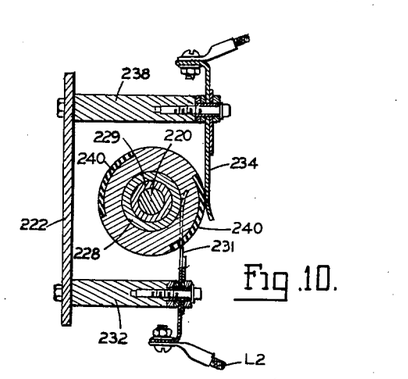
Figure 10 is a view taken on line 10—10, Figure 9.

Diametrically opposed pairs of the solenoids 215, 218, are energized simultaneously to effect inward movement of diametrically opposed portions of the casing 92. The pairs of solenoids are energized progressively about the axis of the casing. This is accomplished by conducting disks 224, 225, 226 and 227 mounted upon a current conducting sleeve 228 which, in turn, is mounted upon a sleeve 229 formed of insulating material and which is fixedly secured to the shaft 220, as by a set screw or pin 230, see Figure 10.

Figure 11:
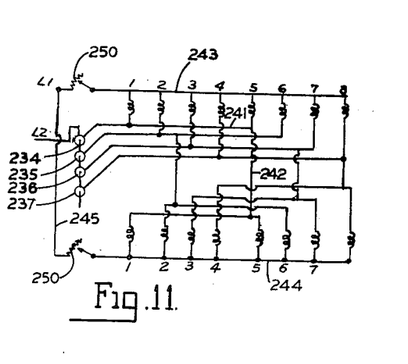
Figure 11 is a schematic wiring diagram of the electrical circuit for the casing actuating mechanism shown in Figures 8, 9 and 10.

A brush 231 is mounted on a support 232 carried by the plate 222 and engages the conducting sleeve 228 to supply current to all four of the disks 224–227. There is a series of brushes 234, 235, 236 and 237 mounted upon a support 238 also carried by the plate 222. These brushes are arranged to engage the disks 224–227 respectively, and each of the disks is provided with arcuate pieces 240 formed of insulating material. The brush 231 is connnected to the line L2, see Figure 11. The brush 234 is connected to diametrically opposed solenoids 1 and 5 in the upper series through wire 241, and to solenoids 1 and 5 in the lower series through wire 242. All of the solenoids in the upper series are connected to the return side of the line L1 through wire 243, and all of the solenoids in the lower series are connected to the common side of the line through wires 244, 245.

The insulating pieces 240 on each of the disks 224–227 are arranged relatively so that opposite pairs of the solenoids, such as 1, 5; 2, 6, etc., are energized progressively about the axis of the casing. A variable resistor 250 is connected in the return side of each series of solenoids and the current flow in the solenoids can accordingly be varied to vary the amplitude of the radial movement of the casing 92, this feature corresponding in function to changing the position of the rollers 134 in their mounting on the ring gear 116 in the mechanical structure previously described.

What we claim is:

1. Apparatus for compacting loose refractory material between the rims of pieces of green chinaware arranged in a bung comprising a frame, a support for a bung of ware, a casing formed of flexible material surrounding the bung in spaced relation thereto for receiving a quantity of refractory material, and casing actuating means operable to effect simultaneous movement of diametrically opposite side portions of the casing radially toward and from the axis of the bung progressively about the circumference of the casing.

2. Apparatus for compacting loose refractory material between the rims of pieces of green chinaware arranged in a bung comprising a frame, a support for a bung of ware, a casing formed of flexible material surrounding the bung in spaced relation thereto, a hopper containing a quantity of refractory material positioned above said casing, means operable to dispense a quantity of refractory material from said hopper into the casing, and casing actuating means operable to effect simultaneous movement of diametrically opposite side portions of the casing radially toward and from the axis of the bung progressively about the circumference thereof.

3. Apparatus for compacting loose refractory material between the rims of pieces of green chinaware arranged in a bung comprising a frame, a support for a bung of ware, a casing formed of flexible material surrounding the bung in spaced relation thereto for receiving a quantity of refractory material, and casing actuating means operable to simultaneously move diametrically opposite side portions of the casing radially toward and from the axis of the bung progressively about the circumference thereof, and means for varying the amplitude of said radial movement.

4. Apparatus for compacting loose refractory material between the rims of pieces of green chinaware arranged in a bung comprising a frame, a cylindrical casing formed of flexible material carried by the frame, a conveyor extending below said casing and being operable to advance a bung of ware in registration with said casing, means operable to move said casing downwardly about a bung of ware positioned on said conveyor, a vertically arranged chute carried by the frame and having its lower end arranged to discharge refractory material into the casing, means operable to dispense a quantity of refractory material in said chute, said casing actuating means operable to effect radial movement of diametrically opposite side portions of the casing progressively about the circumference thereof.

5. Apparatus for compacting loose refractory material between the rims of pieces of green chinaware arranged in a bung comprising a frame, a conveyor, a cylindrical casing formed of flexible sheet material carried by the frame and being movable toward and from the conveyor, said conveyor being operable to advance a bung of ware into registration with said casing and means operable to lower said casing about a bung of ware positioned on said conveyor, means for supporting a quantity of refractory material, and means operable to discharge said refractory material from said supporting means into the casing, actuating means operatively engaging said casing and being operable to effect radial movement of diametrically opposite side portions thereof inwardly and outwardly progressively about the circumference of the casing.

6. Apparatus for compacting loose refractory material between the rims of pieces of green chinaware arranged in a bung comprising a frame, a conveyor, a carriage mounted on the frame above the conveyor for movement toward and from the same, a cylindrical casing formed of resilient sheet material mounted on said carriage, said conveyor being operable to advance a bung of ware in axial registration with said casing, means operable to move said carriage downwardly to position said casing about the bung of ware positioned on said conveyor, power means mounted on said carriage and being operable to compress diametrically opposite side portions of the casing inwardly progressively about the circumference of the casing.

7. Apparatus for compacting loose refractory material between the rims of pieces of green chinaware arranged in a bung comprising a frame, a support for a bung of ware, a carriage mounted on the frame above the support for movement toward and from the same, said carriage including a cylindrical member, a casing formed of flexible material mounted in said cylindrical member, means operable to move said carriage downwardly to position said casing about a bung of ware positioned on said conveyor, means for discharging a quantity of refractory material in said casing, power operated means operable to effect compression of diametrically opposite side portions of said casing progressively about the circumference of the casing.

8. Apparatus for compacting loose refractory material between the rims of pieces of green chinaware arranged in a bung comprising a frame, a conveyor, a carriage mounted on the frame above the conveyor for movement toward and from the same, said carriage including a cylindrical member, a cylindrical casing formed of resilient material mounted in said cylindrical member, means operable to move said carriage downwardly to position said casing about a bung of ware positioned on said conveyor, means operable to discharge a quantity of refractory material between the bung and said casing, casing actuating mechanism carried by said cylindrical member and being operatively connected to said casing, a motor mounted on said carriage for operating said actuating mechanism and said mechanism, when operated, effecting compression of diametrically opposite side portions of said casing progressively about the circumference thereof.

9. Apparatus for compacting loose refractory material between the rims of pieces of green chinaware arranged in a bung comprising a frame, a support for a bung of ware, a carriage mounted on the frame above said support for movement toward and from the same, said carriage including a cylindrical member, a cylindrical casing formed of resilient material arranged concentrically within the casing, an annular support positioned between said cylindrical member and said casing and being fixedly secured to said cylindrical member, an annular actuating member encircling the casing and being mounted for rotation on said support member, means carried by said annular actuating member and operable upon rotation thereof to effect compression of diametrically opposite side portions of said casing progressively about the circumference thereof, means for discharging a quantity of refractory material in said casing, and power operated means mounted upon the carriage and being operable to effect rotation of said annular actuating member.

10. Apparatus for compacting loose refractory material between the rims of pieces of green chinaware arranged in a bung comprising a frame, a support for a bung of ware, a carriage mounted on the frame above said support for movement toward and from the same, said carriage including a cylindrical member, a cylindrical casing formed of resilient material arranged concentrically within the casing, an annular series of electro-responsive devices arranged between said casing and said cylindrical member, switch mechanism operable to energize pairs of said devices diametrically arranged successively about the series, said devices being operable when energized to effect compression of diametrically opposed side portions of said casing, and means for discharging a quantity of refractory material in said casing.

11. Apparatus for compacting loose refractory material between the rims of pieces of green chinaware arranged in a bung comprising a frame, a support for a bung of ware, a carriage mounted on the frame above said support for movement toward and from the same, said carriage including a cylindrical member, a cylindrical casing formed of resilient material arranged concentrically within the casing, an annular series of electro-responsive devices arranged between said casing and said cylindrical member and being operatively connected to the upper portion of said casing, a second series of electro-responsive devices arranged between said casing and said cylindrical member and being operatively connected to the lower portion of said casing, said members being operable when energized to effect compression of said casing, and switch mechanism operable to energize diametrically opposed pairs of said devices progressively about said annular series, and means for discharging a quantity of refractory material in said casing.

12. Apparatus for compacting loose refractory material between the rims of pieces of green chinaware arranged in a bung comprising a frame, a support for a bung of ware, a carriage mounted on the frame above said support for movement toward and from the same, said carriage including a cylindrical member, a cylindrical casing formed of resilient material arranged concentrically within the casing, an annular series of electro-responsive devices arranged between said casing and said cylindrical member and being operatively connected to the upper portion of said casing, a second series of electro-responsive devices arranged between said casing and said cylindrical member and being operatively connected to the lower portion of said casing, said members being operable when energized to effect compression of said casing, and switch mechanism operable to energize diametrically opposed pairs of said devices progressively about said annular series, and means for varying the current to each of said series separately, and means for discharging a quantity of refractory material in said casing.

13. Apparatus for compacting loose refractory material between the rims of pieces of green chinaware arranged in a bung comprising a frame, a horizontally extending conveyor operable to advance a procession of bungs of ware, a carriage mounted on the frame for vertical movement toward and from said conveyor, a cylindrical casing formed of resilient material mounted on the carriage and adapted to encircle a bung of ware positioned on said conveyor upon downward movement of said carriage, an upper accumulating hopper, a lower hopper, and a discharge chute extending from said lower hopper for discharging refractory material therefrom into said casing, a collecting hopper arranged below said conveyor, a vertically arranged refractory material conveyor operable to convey such material from said collecting hopper to said upper hopper, a gate mounted in said upper hopper and means operable to open said gate to discharge a quantity of material into said lower hopper, a second gate mounted in said lower hopper, and means operable to open said gate to discharge refractory material from said lower hopper through said chute into said casing, and power operated means mounted on said carriage and being operable to compress diametrically opposite side portions of said casing progressively about the circumference thereof, and motion transmitting mechanism for operating said conveyor, carriage and gates in timed relation.

References Cited in the file of this patent

UNITED STATES PATENTS

| Number | Name | Date |
|---|---|---|
| 1,753,412 | Harris | Apr. 8, 1930 |
| 2,347,940 | Emerson | May 2, 1944 |
| 2,359,879 | Schweitzer | Oct. 10, 1944 |
| 2,469,229 | Gould | May 3, 1949 |